US 8,949,594 B2

(12) United States Patent
Vigliaturo et al.

(10) Patent No.: US 8,949,594 B2
(45) Date of Patent: Feb. 3, 2015

(54) SYSTEM AND METHOD FOR ENABLING A SCALABLE PUBLIC-KEY INFRASTRUCTURE ON A SMART GRID NETWORK

(71) Applicant: Silver Spring Networks, Redwood City, CA (US)

(72) Inventors: Christopher Vigliaturo, San Jose, CA (US); Benjamin Damm, Belmont, CA (US); David Drinan, San Mateo, CA (US); Aditi Hilbert, Redwood City, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 136 days.

(21) Appl. No.: 13/797,378

(22) Filed: Mar. 12, 2013

(65) Prior Publication Data

US 2014/0281483 A1    Sep. 18, 2014

(51) Int. Cl.
*H04L 29/06*    (2006.01)

(52) U.S. Cl.
CPC .................................. *H04L 63/0471* (2013.01)
USPC .......................................... 713/153; 713/150

(58) Field of Classification Search
CPC ............ H04L 63/0428; H04L 63/0442; H04L 63/0471; H04L 63/062; H04L 63/06
See application file for complete search history.

(56) References Cited

U.S. PATENT DOCUMENTS

| | | | | |
|---|---|---|---|---|
| 6,473,508 | B1* | 10/2002 | Young et al. | 380/30 |
| 2004/0039925 | A1* | 2/2004 | McMillan et al. | 713/189 |
| 2010/0306533 | A1* | 12/2010 | Phatak | 713/156 |
| 2012/0173873 | A1* | 7/2012 | Bell et al. | 713/156 |
| 2012/0239937 | A1* | 9/2012 | Yamanaka et al. | 713/179 |
| 2012/0266209 | A1* | 10/2012 | Gooding et al. | 726/1 |
| 2013/0046989 | A1* | 2/2013 | Lakshminarayanan | 713/176 |
| 2013/0061055 | A1* | 3/2013 | Schibuk | 713/172 |
| 2013/0097429 | A1* | 4/2013 | Grandcolas et al. | 713/185 |
| 2013/0103954 | A1* | 4/2013 | Arnold et al. | 713/189 |
| 2014/0095879 | A1* | 4/2014 | Fedronic et al. | 713/171 |
| 2014/0108789 | A1* | 4/2014 | Phatak | 713/156 |
| 2014/0122878 | A1* | 5/2014 | Cho et al. | 713/168 |
| 2014/0143826 | A1* | 5/2014 | Sharp et al. | 726/1 |

* cited by examiner

*Primary Examiner* — Jeffrey Pwu
*Assistant Examiner* — Carlos Amorin
(74) *Attorney, Agent, or Firm* — Osha Liang LLP (57) ABSTRACT

A method for enabling a scalable public-key infrastructure (PKI) comprises invoking a process of receiving a message for a device, identifying an association ID for the device, retrieving encrypted association keys stored on the server for communicating with the device, the encrypted association keys encrypted using a wrapping key stored on a Hardware Security Module (HSM). The method further comprises sending the message and the encrypted association keys to the HSM, unwrapping, by the HSM, the encrypted association keys to create unwrapped association keys, cryptographically processing the message to generate a processed message, deleting the unwrapped association keys, sending the processed message to the device, and invoking, concurrently and by a second application, the process.

21 Claims, 5 Drawing Sheets

SYSTEM AND METHOD FOR ENABLING A SCALABLE PUBLIC-KEY INFRASTRUCTURE ON A SMART GRID NETWORK

BACKGROUND

The electrical grid of the United States, and many other countries, is outdated. The energy demands of the U.S., and countries worldwide, are rapidly increasing as more and more devices demand more and more power. Any improvements in the electrical grid will result in substantial cost savings to utilities, consumers, and the environment, due to the massive size of the electrical grid. These improvements are slowly being realized as the old electrical grid gives way to the smart grid. However, the improvements that the smart grid brings also come with substantial technological challenges. One of those challenges is providing security for the smart grid.

SUMMARY OF INVENTION

In general, in one aspect, the invention relates to a method for enabling a scalable public-key infrastructure (PKI). The method comprises: invoking, by a first application, a process comprising: receiving, by a server, a message for a device; identifying, by the server, an association ID for the device; retrieving, by the server and using the association ID, a plurality of encrypted association keys stored on the server for communicating with the device, wherein the plurality of encrypted association keys are encrypted using a wrapping key stored on a Hardware Security Module (HSM); sending the message and the plurality of encrypted association keys to the HSM; unwrapping, by the HSM and using the wrapping key, the plurality of encrypted association keys to create unwrapped association keys; cryptographically processing, by the HSM and using the unwrapped association keys, the message to generate a processed message; deleting the unwrapped association keys; sending the processed message to the device; and invoking, by a second application, the process, wherein the first application and the second application invoke the process concurrently.

In general, in one aspect, the invention relates to a non-transitory computer-readable medium (CRM) storing a plurality of instructions for enabling a scalable public-key infrastructure (PKI). The plurality of instructions comprising functionality to: receive a message for a device; identify an association ID for the device; retrieve, using the association ID, a plurality of encrypted association keys stored on a server for communicating with the device, wherein the plurality of encrypted association keys are encrypted using a wrapping key stored on a Hardware Security Module (HSM); send the message and the plurality of encrypted association keys to the HSM; unwrap, by the HSM and using the wrapping key, the plurality of encrypted association keys to create unwrapped association keys; cryptographically process, by the HSM using the unwrapped association keys, the message to generate a processed message; delete the unwrapped association keys; send the processed message to the device; and wherein the plurality of instructions are invoked concurrently by a first application and a second application.

In general, in one aspect, the invention relates to a system for enabling a scalable Public-Key Infrastructure (PKI). The system comprises: a device, configured to receive a processed message; and an application server configured to: receive a message for the device, identify an association ID for the device, retrieve, using the association ID, a plurality of encrypted association keys stored on the application server for communicating with the device, wherein the plurality of encrypted association keys are encrypted using a wrapping key stored on a Hardware Security Module (HSM), send the message and the plurality of encrypted association keys to the HSM, receive the processed message from the HSM, and send the processed message to the device, wherein the HSM is configured to: unwrap, using the wrapping key, the plurality of encrypted association keys to create unwrapped association keys, cryptographically process, using the unwrapped association keys, the message to generate a processed message, delete the unwrapped association keys, and send, to the application server, the processed message wherein the system is invoked concurrently by a first application and a second application.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for enabling a scalable Public Key Infrastructure (PKI) on a smart grid network. Specifically, after a message for a device on the network is received, an association ID for the device is identified, a multitude of encrypted association keys are retrieved, and the message and the encrypted association keys are sent to a Hardware Security Module (HSM). The HSM unwraps the encrypted association keys, uses the association keys to cryptographically process the message, deletes the unwrapped association keys, and sends the now-encrypted message to the server, which then forwards the encrypted message to the intended device. Further, as used throughout this document, the terms unwrap/decrypt and wrap/encrypt (and derivatives thereof) may be used interchangeably. Further still, the term, "cryptographically process" may include encrypting, decrypting, performing integrity checks, and/or any other cryptographic process.

Figure 1:
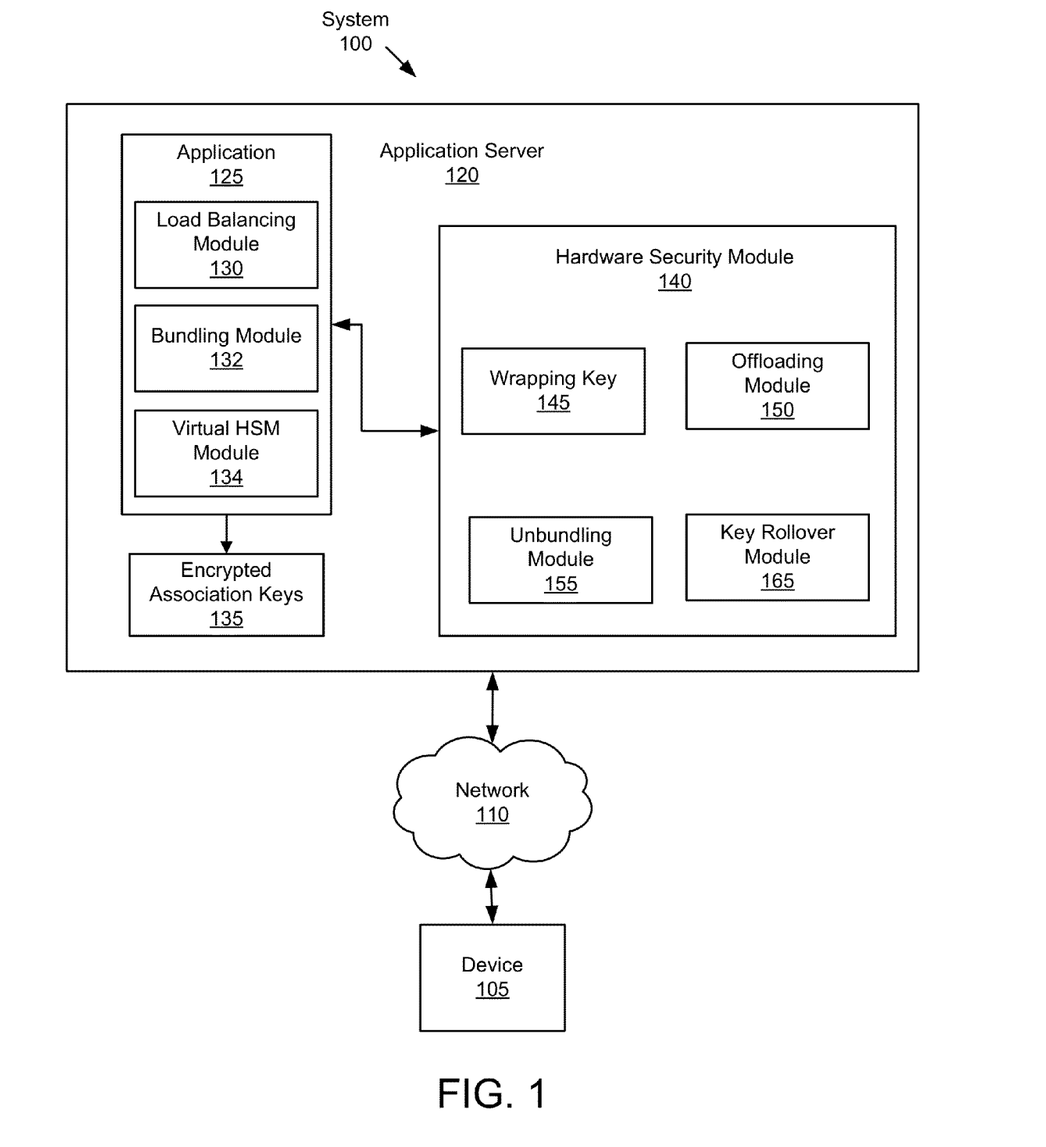
FIG. 1 shows a flow diagram of a system in accordance with one or more embodiments of the invention.

FIG. 1 shows a system (100), which includes a Device (105), a Network (110), an Application Server (120), an Application (125), a Load Balancing Module (130), a Bundling Module (132), a Virtual HSM Module (134), a multitude of Encrypted Association keys (135), a Hardware Security Module (140), a Wrapping Key (145), an Offloading Module (150), a Unbundling Module (155), and a Key Rollover Module (165). In one or more embodiments of the invention, the system (100) includes a smart grid. In one or more embodiments of the invention, the smart grid is an electrical grid that also uses information and communications technology to gather information and respond to the gathered information. The smart grid may also include other improvements on the "traditional" electrical grid. In particular, in one or more embodiments of the invention, the invention relates to the transmission of data for any purposes needed on or within the smart grid and the security precautions necessary for protection of those transmissions. Additionally, in one or more embodiments of the invention, the system (100) involves a Public-Key Infrastructure (PKI) for the managing of digital certificates and binding public keys with user identities. The public keys, as well as other keys, may be used for identification and/or encryption for the various components of the system (100). Alternatively, the system (100) may be any type of network and should not be limited to the above examples.

In one or more embodiments of the invention, Device (105) is one or more devices on a smart grid that includes functionality to receive or send communications. For example, Device (105) may include one or more of an electrical meter, an electric vehicle, an air-conditioner, a heater, a refrigerator, a personal computer, a laptop, etc. In other words, Device (105) may be an endpoint on the smart grid. As another example, Device (105) may be a computer used by the utility company that runs, or owns, the smart grid to send commands to endpoints on the smart grid. In one or more embodiments of the invention, Device (105) has a Network Interface Card (NIC) (not shown) that includes functionality to handle the receiving, sending, and/or processing of communications from the smart grid. For example, Device (105) may be able to be remotely powered off (or on) by the electrical utility overseeing the smart grid or other party. Further, Device (105) may include functionality to send or receive various requests or commands concerning topics including, but not limited to meter readings, distribution automation, outage detection, demand response, network monitoring and/or management, etc. In one or more embodiments of the invention, millions (or even tens of millions) of devices may exist on the smart grid.

In one or more embodiments of the invention, Network (110) is a network with functionality to enable the devices on the smart grid (i.e., Device (105)) to communicate with other devices, such as HSMs, Application Server (120), and/or any other suitable device on Network (110). Network (110) may take many different forms and have many different components. For example, Network (110) may be, but is not limited to, a Wide Area Network (WAN), a Local Area Network (LAN), the Internet, cell towers or communication via cellular signals, radio signals, and/or any other network. In one or more embodiments of the invention, Network (110) is a standards-based Internet Protocol Version 6 (IPv6) Network.

Continuing with FIG. 1, Application Server (120) is any general purpose server, cluster, rack, computer, etc. in accordance with one or more embodiments of the invention. Application Server (120) may contain many different components including, but not limited to: a processor(s), memory, harddrives, etc. Application Server (120) is communicatively connected with Hardware Security Module (HSM) (140) and Network (110). In one or more embodiments of the invention, Application Server (120) may handle all direct communication with endpoints (i.e., Device (105)) on the system. Alternatively, other components of the system may also communicate with endpoints.

In one or more embodiments of the invention, HSM (140) is a part of Application Server (120) (i.e., a plug-in card, etc.). Alternatively, HSM (140) is a device separate from Application Server (120). In one or more embodiments of the invention, in addition to HSM (140), Application Server (120) contains Application (125) and the multitude of Encrypted Association Keys (135). In one or more embodiments of the invention, Application Server (120) does not contain any special security features, such as physical tamper-resistance measures (in contrast to HSM (140)).

In one or more embodiments of the invention, Application (125) is one or more applications executing on Application Server (120), and provides a variety of functionalities to implement aspects of the invention. For example, Application (125) may be an advanced metering manager that automates gathering electrical meter data from any or all of the meters on the smart grid, a power monitor that provides alerts when voltage falls outside of a threshold, an outage detection system that pinpoints information relating to a power outage, a demand response manager for variable pricing, a system manager, and/or any other program with functionalities to implement aspects of the invention. In one or more embodiments of the invention, substantial portions of Application (125) may execute on another computer (i.e., a fat client). Alternatively, most of the execution of Application (125) may be performed on Application Server (120) (i.e., a thin client). In one or more embodiments of the invention, Application (125) handles communication with the HSM (140), and is able to forward communications to, and receive communication from, one or more devices (i.e., Device (105)) on the smart grid.

Continuing with FIG. 1, Load Balancing Module (130) is a program or module executing on Application Server (120) that facilitates load balancing amongst clustered HSMs in accordance with one or more embodiments of the invention. Alternatively, or in addition, Load Balancing Module (130) may be a program or module executing on HSM (140). Specifically, Load Balancing Module (130) enables load balancing between multiple HSMs accessed by multiple smart grid applications leveraging the same key management platform. Load balancing may be implemented in any manner now known or later developed. In one or more embodiments of the invention, failover may occur when less than 60% of HSMs within a cluster are available. In the event of a failover, Load Balancing Module (130) would halt using all HSMs within the cluster that is failing, move over to the next available cluster of HSMs, and resume execution. In one or more embodiments of the invention, two clusters of HSMs are executing, namely the primary and the secondary cluster, with each cluster having three HSMs within the cluster. Alternatively, there may be three, four, or any number of HSM clusters, each containing any number of HSMs.

Continuing with FIG. 1, Bundling Module (132) executes within Application (125) on Application Server (120), and is a series of modifications, additions, or improvements made to the PKCS#11 framework, or other format/framework, and enables the bundling together of multiple cryptographic operations into one bulk atomic operation in accordance with one or more embodiments of the invention. As used herein, an operation is atomic when it appears to the rest of the system to occur instantaneously. Specifically, Bundling Module (132) focuses on reducing the overhead in the various communication layers of PKCS#11, thereby greatly increasing the number of operations per second possible. In one or more embodiments of the invention, Bundling Module (132) reduces the communication overhead by combining many smaller commands or messages into a single, bulk message. Bundling Module (132) works in conjunction with Unbundling Module (155), which executes on HSM (140).

Although many different operations may be bundled together, in particular, the process of encrypting or decrypting a message for a device (i.e., Device (105)) may be a bundled atomic operation when executed on the HSM (140) of the present invention. Specifically, given two unwrapped keys, the process of producing the HMAC result and the encrypted message, and deleting the unwrapped keys is atomic (for encryption) in accordance with one or more embodiments of the invention. Similarly, the decryption process also would be atomic in accordance with one or more embodiments of the invention. Thus, in one or more embodiments of the invention, when Application Server (120) sends encrypted association keys and a message to HSM (140), the message and keys appear to Application Server (120) as though the process of encrypting/decrypting is instantaneous. In one or more embodiments of the invention, the bundling combines multiple PKCS#11 messages into a single message/operation, thereby allowing the system to scale to an extremely large size/throughput.

Continuing with FIG. 1, in one or more embodiments of the invention, Virtual HSM Module (134) is a module executing on Application Server (120) with functionality to enable multithreading, and the creation of virtual HSM slots to increase the connection limits of HSM (140). Alternatively, Virtual HSM Module (134) may be implemented in a module executing on HSM (140). In one or more embodiments of the invention, the default connection limit settings on some HSMs (e.g., HSM (140)) allow at least 3,000 operations per second within a single connection. However, if a single client application opens at least five simultaneous sessions with the HSM, then approximately 11,000 operations per second may be expected. Virtual HSM Module (134) may enable the increased operations per second by altering the configuration files of HSM (140), which then forces HSM (140) to operate as though there were up to five more slots that the application could contact for its operations. In one or more embodiments of the invention, Virtual HSM Module (134) may duplicate the IP address of the HSM, and increase the connection limit of the HSM(s). In one or more embodiments of the invention, no more than five virtual slots per HSM may be used. Alternatively, any number of virtual slots may be implemented and used in line with the method of this invention. In one or more embodiments of the invention, a limit of 256 secure connections is maintainable using the method of this invention.

Additionally, in one or more embodiments of the invention, Virtual HSM Module (134) may enable multi-threading of cryptography operations. The multi-threading may be done in any method now known or later developed. Specifically, the multi-threading may enable multiple cryptography operations to access the same key within the HSM. For example, multiple key establishment processes may access the same key on the HSM, for generation of additional keys, simultaneously. This process is advantageous because key establishment processes are typically more expensive operations than other common cryptography operations, such as encryption/decryption or integrity checks.

In one or more embodiments of the invention, Encrypted Association Keys (135) are keys stored on the Application Server (120) in an encrypted form. Notably, Application Server (120) need not have any specific security protections—in contrast to HSM (140). In one or more embodiments of the invention, Encrypted Association Keys (135) exist for each device on the smart grid. Alternatively, Encrypted Association Keys (135) may be generated after a secure association with an endpoint is requested. In one or more embodiments of the invention, Encrypted Association Keys (135) includes two separate keys. However, there may be instances where one key (or more than two keys) may need to be associated with each set of Encrypted Association Keys (135). Each individual key included in Encrypted Association Keys (135) may be encrypted using the same methodology/key or may be encrypted using different methods/keys. In one or more embodiments of the invention, Encrypted Association Keys (135) may include a Hash-based Message Authentication Code (HMAC) key, an Advanced Encryption Standard (AES) key, and/or other types of keys.

In one or more embodiments of the invention, additional data is stored in an encrypted or un-encrypted state alongside, or associated with, Encrypted Association Keys (135). For example, a wrapping key identifier (not shown) may be stored alongside its associated Encrypted Association Keys (135). The wrapping key identifier (not shown) may identify which wrapping key (e.g., Wrapping Key (145)) was used to encrypt the Encrypted Association Keys (135) as well as which key should be used for unwrapping/decryption. In one or more embodiments of the invention, the Encrypted Association Keys (135) is identified by an association ID (not shown) which is a unique identifier for each Device (105) on the smart grid. In one or more embodiments of the invention, the Encrypted Association Keys (135) are encrypted using Wrapping Key (145) which resides within a slot on HSM (140). Both of these components are discussed further below.

Continuing with FIG. 1, the association keys that make up Encrypted Association Keys (135) are generated by HSM (140) in accordance with one or more embodiments of the invention. Further, Encrypted Association Keys (135) may be deleted as needed, such as after completing a communication with a device, after a time period for renewal has expired, when the device is removed from the network, or any other time. Additionally, Encrypted Association Keys (135) may be renewed according to a set schedule (e.g., every 60 days), based on a random sampling (e.g., 10% of all Encrypted Association Keys (135) are renewed each day), or using any other metric. In one or more embodiments of the invention, Encrypted Association Keys (135) are accessed simultaneously by many different applications using the same platform (e.g., any application executing on Application Server (120), any application executing on a device within the smart grid, etc.). Further, the operations to create, encrypt, decrypt, delete and/or use decrypted association keys may be atomic operations, as further discussed below, to enable supporting multiple simultaneous accesses of the same set of Encrypted Association Keys (135) by the same or different applications.

Further, in one or more embodiments of the invention, there may be multiple sets of Encrypted Association Keys (135), rather than just one set. For example, if multiple applications are running on different application servers there may be one set of Encrypted Association Keys (135) for each application. Alternatively, as another example, there may be one set of Encrypted Association Keys (135) for each application server. It will be apparent that there are many ways to establish multiple sets of Encrypted Association Keys (135) and, as such, the invention should not be limited to the above examples.

In one or more embodiments of the invention, Hardware Security Module (HSM) (140) is a secure cryptoprocessor for the managing of digital keys, accelerating cryptoprocesses, and for providing strong authentication for applications. Specifically, HSM (140) includes a variety of security features, as known in the art, including physical protection (i.e., tamper resistant mechanisms). HSM (140) may be a plug-in card or a component of Application Server (120). Alternatively, HSM (140) may be a device external to Application Server (120). In one or more embodiments of the invention, multiple HSMs are clustered together and/or multiple clustered HSMs may exist (e.g., a first cluster contains three HSMs, and a second cluster contains five HSMs). Additionally, functionality for load-balancing as well as fail-over mechanisms may be in place. HSM (140) may use any of the Application Programming Interfaces (API) now known or later developed. In particular, Public-Key Cryptography Standards 11 (PKCS#11) may provide the base functionality on which the various aspects of the invention supplement, modify, improve, and/or alter. In one or more embodiments of the invention, HSM (140) contains a limited amount of storage and adding addition storage (or additional HSMs) tends to be costly. HSM (140) includes Wrapping Key (145), Offloading Module (150), Unbundling Module (155), and Key Rollover Module (165).

In one or more embodiments of the invention, Wrapping Key (145) is used to encrypt association keys so that they may be offloaded onto a server (e.g., Application Server (120)), thus saving storage/memory space on HSM (140). Specifically, the association keys are offloaded because when the system is a smart grid, the amount of endpoints may number in the millions, and storing two (or more) unique keys for each endpoint within HSM (140) tends to be nearly impossible or prohibitively expensive. In one or more embodiments of the invention, Wrapping Key (145) is stored on HSM (140) to ensure the security of the key because HSM (140) contains advanced security features, as described above, that are not present on other servers (e.g., Application Server (120)). Thus, the encrypted association keys are effectively stored with the same level of security as the wrapping key, but without taking up valuable space on the HSM (140). Further, in one or more embodiments of the invention, Wrapping Key (145) is used by or in conjunction with Offloading Module (150) to enable the processes involved in creating, maintaining, and utilizing Encrypted Association keys (135).

Continuing with FIG. 1, Offloading Module (150) is responsible for the generation of association keys, wrapping keys, and management of the keys including encrypting/decrypting of the keys in accordance with one or more embodiments of the invention. The association keys, wrapping keys, and any other keys necessary to implement the invention may be generated by any method now known or later developed. In particular, an Elliptic Curve Diffie-Hellman (ECDH) operation with an external public key and an internal private key, followed by a series of derivation steps may be used to generate keys. For example, Table 1 (found below) shows the series of derivation steps that could be used for generating a key in one or more embodiments of the invention.

TABLE 1

The ECDH result is suffixed with a collection of 10 bytes:
0x00000001000000XXYYZZ.
The resulting value is SHA1 hashed.
The ECDH result is suffixed with a collection of 10 bytes:
0x00000002000000XXYYZZ.
The result is SHA1 hashed.
The two SHA1 hash results are concatenated and truncated to KZ bytes.
Finally, the resulting key is wrapped and extracted.
The variables used in the above derivation process are:
XX: 0x05 for the HMAC key derivation, 0x03 for the AES key derivation
YYZZ: two bytes to indicate the association ID (16-bit); this value is passed in with the request for generation of key(s)
KZ: The final key size (e.g., 16, 24, or 32)

In one or more embodiments of the invention, Offloading Module (150) is a series of modifications, additions, or improvements made to the PKCS#11 framework, or any other format/framework, which HSM (140) may use. Offloading Module (150) is able to receive an encrypted association key (e.g., Encrypted Association Keys (135)), a wrapping key identifier, and a message for a device (i.e., Device (105)), and unwrap the encrypted association key using the identified wrapping key. In one or more embodiments of the invention, Offloading Module (150) is then able to encrypt the message for the device using the unwrapped association keys, and send the now-encrypted message to Application Server (120) for forwarding to the device.

Offloading Module (150) may delete the unwrapped association keys from memory on the HSM (140) after the unwrapped keys have been used for their intended purpose (i.e., encryption or decryption). This deletion process may be performed for the purpose of saving space and/or processing power within the HSM (140) in view of the large amount of information flowing through the smart grid. In one or more embodiments of the invention, the deleting of the unwrapped association keys involves freeing the reference to the unwrapped keys. In one or more embodiments of the invention, other modules or components may perform some of the functionality of Offloading Module (150), and as such, the invention should not be limited only to the above examples.

Continuing with FIG. 1, Unbundling Module (155) executes on HSM (140) and is a series of modifications, additions, or improvements made to the PKCS#11 framework, or other format/framework, which HSM (140) may use to enable bundling together of multiple cryptographic operations into one bulk atomic operation in accordance with one or more embodiments of the invention. Unbundling Module (155) works in conjunction with Bundling Module (132), as described above. Specifically, Unbundling Module (155) performs the opposite functions of Bundling Module (132). In one or more embodiments of the invention, some, or all, of the functionality of Bundling Module (132) may be performed by Unbundling Module (155), and vice-versa.

In one or more embodiments of the invention, Key Rollover Module (165) is a series of modifications to PKCS#11 and/or a module executing on HSM (140) that handles renewals of association keys. Alternatively, Key Rollover Module (165) may execute on Application Server (120) (e.g., a module of Application (125)). Specifically, association keys should be renewed at certain points, to ensure and improve the overall security of System (100). Ordinarily, association keys may be renewed on a set time basis (i.e., 60 days after creation of the key(s)). However, in one or more embodiments of the invention, when system (100) is a smart grid having millions of endpoints, the simultaneous renewal of potentially hundreds of thousands (or millions) of keys would greatly slow down overall network traffic, and could even potentially crash the network. Thus, Key Rollover Module (165) establishes rules for renewal of association keys. In particular, in one or more embodiments of the invention, the rule for renewal of association keys is that a random sampling of association keys, representing a set percentage of all keys on the network, is renewed each day. For example, ten percent of all keys on system (100) may be renewed each day. This randomized renewal of association keys ensures that keys are renewed for security purposes, while simultaneously not reducing overall system performance. Many different rules exist that Key Rollover Module (165) may implement and, as such, the invention should not be limited only to the above example(s).

Figure 2A:
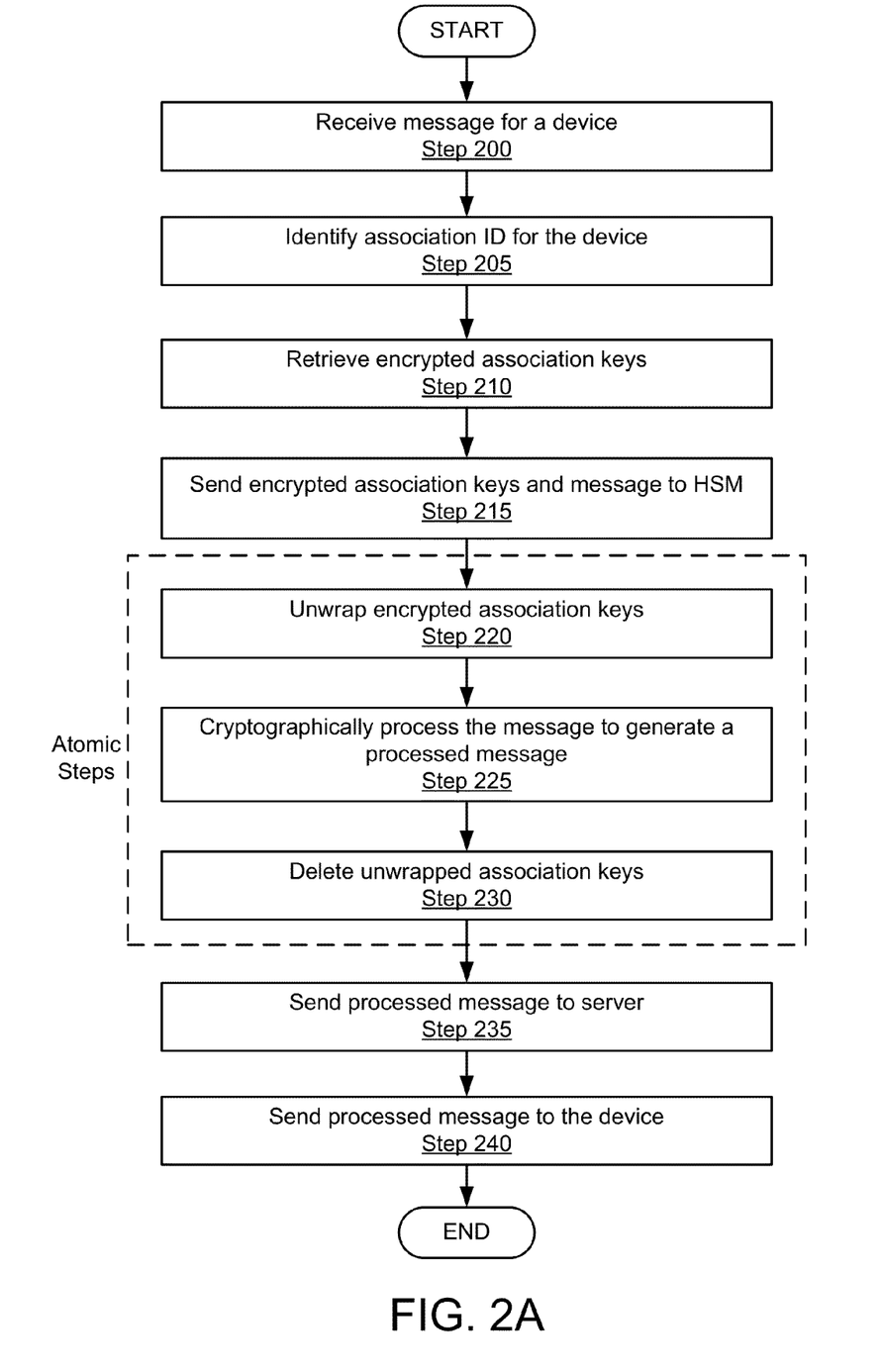
FIGS. 2A and 2B show flowcharts of a method in accordance with one or more embodiments of the invention.
Figure 2B:
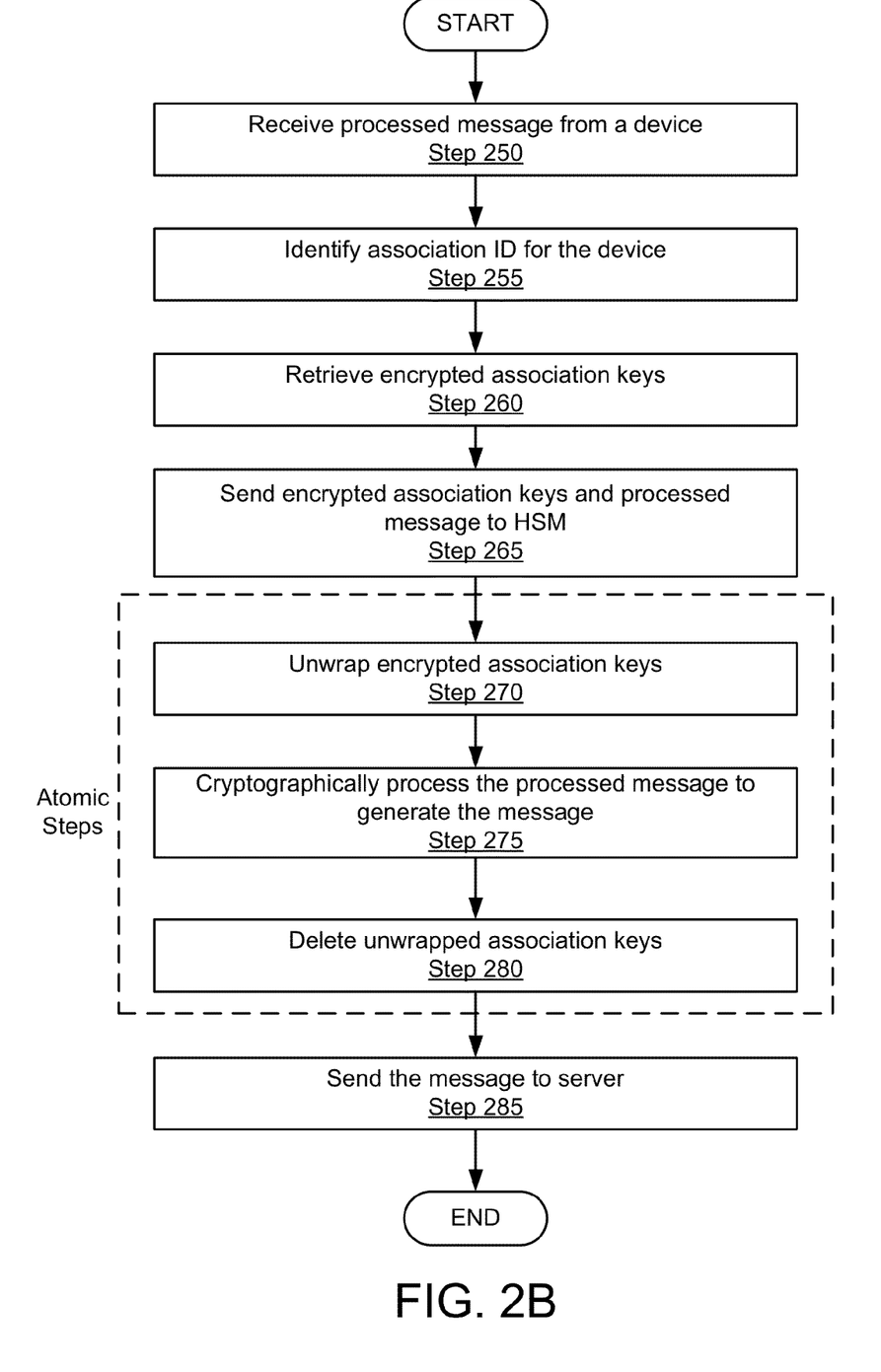

FIGS. 2A and 2B show flowcharts for enabling a scalable PKI. Specifically, FIG. 2A shows the method of cryptographically processing and sending a message within a system with scalable PKI, while FIG. 2B shows the method of receiving and decrypting a message within a system with scalable PKI. The cryptographic processing may include many different forms of processing including, but not limited to: encrypting, decrypting, performing integrity checks, or any other cryptographic process. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIGS. 2A and 2B should not be construed as limiting the scope of the invention.

Referring to FIG. 2A, a message intended for a device is received in Step 200. The message may be in any suitable format and contain any suitable content. The device may be any of one or more devices found on the network including, but not limited to, computers, servers, air conditions, refrigerators, tablet devices, phones, smartphones, electric cars, etc. In one or more embodiments of the invention, the network on which the device resides is a smart grid. The message may be received by an application server(s) that is used to manage all, or part of, the smart grid.

In Step 205, an association ID for the device is identified, in accordance with one or more embodiments of the invention. The association ID may be a unique ID that identifies the device for which the message is intended. In one or more embodiments of the invention, the association ID identifies where other information necessary to contact the device is stored, such as association keys and/or any other suitable information.

In Step 210, encrypted association keys are retrieved, in accordance with one or more embodiments of the invention. The encrypted association keys may be identified using the association ID identified in Step 205. In one or more embodiments of the invention, the encrypted association keys are stored on an application server and the application server on which the encrypted association keys are stored does not have any physical security and need not have any advanced security features. In one or more embodiments of the invention, the encrypted association keys are encrypted using a wrapping key stored on a HSM. The encrypted association keys may include many different keys. For example, the encrypted association keys may include a HMAC key, an AES key, and/or any other kind of key suitable for use in such a network. Optionally, in one or more embodiments of the invention, additional data may be retrieved in this step, such as a wrapping key identifier, which identifies what key was used to wrap the encrypted association keys, and accordingly what key is needed to decrypt the keys. It will be apparent to one of ordinary skill in the art that any number of keys may be stored and the invention should not be limited only to the above examples.

In Step 215, the encrypted association keys and the message is sent to the HSM, in accordance with one or more embodiments of the invention. As discussed above, additional information (such as a wrapping key identifier) may also be sent to the HSM in this step. An application server may send the message and the encrypted association keys to the HSM. The message and the encrypted association keys may be sent in any form and using any method now known or later developed.

In Step 220, the encrypted association keys are unwrapped, in accordance with one or more embodiments of the invention. In one or more embodiments of the invention, the encrypted association keys are unwrapped using a wrapping key stored on the HSM. By storing the wrapping key on the HSM, which is highly secure, the encrypted association keys effectively have the same level of security as any data stored on the HSM, while using the much cheaper and more available storage of an ordinary server. The encrypted association keys may be unwrapped using any method now known or later developed.

In one or more embodiments of the invention, Step 220, in conjunction with Steps 225 and 230, may be atomic. That is, it appears to the other components of the system as though Steps 220, 225, and 230 are performed instantly. Steps 220, 225, and 230 are bundled together and made atomic in the interests of reducing the overhead necessary to perform Steps 220, 225, and 230. Specifically, the HSM receives the complete cryptographic context in a single message, rather than multiple messages. This enables the HSM to handle the message in a single operation without having to build a session context. Alternatively, the HSM is able to handle a single session context without needing any locking mechanism for the applications using the HSM. Further, by bundling these operations together, system performance is easier to predict, which is essential for managing a network performing tens (or hundreds) of thousands of operations per second and having millions of endpoints. In one or more embodiments of the invention, fewer (e.g., Steps 220 and 225, Steps 225 and 230, etc.) or more steps may be atomic and, as such, the invention should not be limited to the above examples.

In Step 225, the message is cryptographically processed to generate a processed message, in accordance with one or more embodiments of the invention. Specifically, the message is processed using the association keys, which were unwrapped in the previous step. Additionally, the message is processed by the HSM. The processed message may be generated following any standard or using any method now known or later developed. Any cryptographic process, such as an integrity check, encryption, etc, may be performed in this step. In one or more embodiments of the invention, Step 225, in conjunction with Step 220 and/or Step 230, may be atomic, as described above.

In Step 230, the unwrapped association keys are deleted, in accordance with one or more embodiments of the invention. The unwrapped association keys temporarily reside on the HSM while the unwrapped association keys are needed for processing the message. After processing is completed, the unwrapped association keys are no longer needed by the HSM, and for space and security reasons, the HSM deletes the unwrapped association keys. The encrypted versions of the association keys still reside on the application server, and are thus still accessible should further communication with the same device occur at some point in the future. In one or more embodiments of the invention, the reference(s) to the unwrapped association keys is freed, rather than formally deleting the unwrapped keys. In one or more embodiments of the invention, Step 230, in conjunction with Step 220 and/or Step 225, may be atomic, as described above.

In Step 235, the processed message is sent to the server, in accordance with one or more embodiments of the invention. Specifically, the HSM sends the processed message to the application server which may then forward the processed message to the intended device. The message may be sent using any method now known or later developed.

Finally, in Step 240, the processed message is sent to the device, in accordance with one or more embodiments of the invention. Specifically, the processed message is forwarded from the application server to the device. When the processed message is received by the device, the device may decrypt the message, confirm its authenticity, perform any other cryptographic processing as needed, and perform the request/command. If a response is needed, the method continues to FIG. 2B.

In FIG. 2B, a processed message is received from a device, in accordance with one or more embodiments of the invention in Step 250. The message may be received in any format now known or later developed. In one or more embodiments of the invention, the processed message is received by an application server. As above, in relation to FIG. 2A, the device may be part of a smart grid network or any other suitable network.

In Step 255, an association ID for the device is identified, in accordance with one or more embodiments of the invention. The association ID may be identified in the same manner as described above with relation to Step 205.

In Step 260, encrypted association keys are retrieved, in accordance with one or more embodiments of the invention. The encrypted association keys may be retrieved in the same manner as described above with relation to Step 210.

In Step 265, the encrypted association keys and the processed message is sent to the HSM, in accordance with one or more embodiments of the invention. The encrypted association keys and the processed message may be sent to the HSM in substantially the same manner as described above with relation to Step 215. There may be minor differences, however, such as the message already being encrypted.

In Step 270, the encrypted association keys are unwrapped, in accordance with one or more embodiments of the invention. The encrypted association keys are unwrapped in substantially the same manner as described above in relation to Step 220. Also, as described above in relation to Steps 220, 225, and 230, Steps 270, 275, and/or 280 may be atomic. Thus, Steps 270, 275, and/or 280 appear to the system as though the steps are performed instantaneously.

In Step 275, the encrypted message is cryptographically processed to generate an unprocessed message, in accordance with one or more embodiments of the invention. The message is processed using the unwrapped association keys, and is decrypted by the HSM. The message may be processed in any manner or method now known or later developed. Any cryptographic processing may be performed in this step, such as an integrity check, decryption, or any other cryptographic process. In one or more embodiments of the invention, Step 275, in conjunction with Step 270 and/or Step 280, may be atomic, as described above.

In Step 280, the unwrapped association keys are deleted, in accordance with one or more embodiments of the invention. In one or more embodiments of the invention, the reference(s) to the unwrapped association keys is freed, rather than formally deleting the unwrapped keys. The unwrapped association keys may be deleted in substantially the same manner as described above in relation to Step 230. In one or more embodiments of the invention, Step 280, in conjunction with Step 270 and/or Step 275, may be atomic, as described above.

In Step 285, the unprocessed message is sent to the server, in accordance with one or more embodiments of the invention. The message may be sent from the HSM to the application server in any format and using any manner now known or later developed. After receiving the message, the application server may perform any action with the message. For example, the message may be stored for later access, forwarded on to a requesting device (such as a computer controlled by an administrator), processed to determine an action the application server should take, and/or any other action. It will be apparent to one of ordinary skill in the art that the application server may perform any number of actions with the message and, as such, the invention should not be limited only to the above examples.

In particular, the method described above in FIGS. 2A and 2B may be invoked concurrently by two or more applications. In other words, the method described above is scalable, thus enabling the method of the invention to be used on a network or smart grid containing millions of endpoints, and sending/receiving thousands (or more) of messages concurrently and securely.

The following section describes various examples of the invention. The examples are included to aid in the understanding of the invention and are not intended to limit the scope of the invention.

Figure 3:
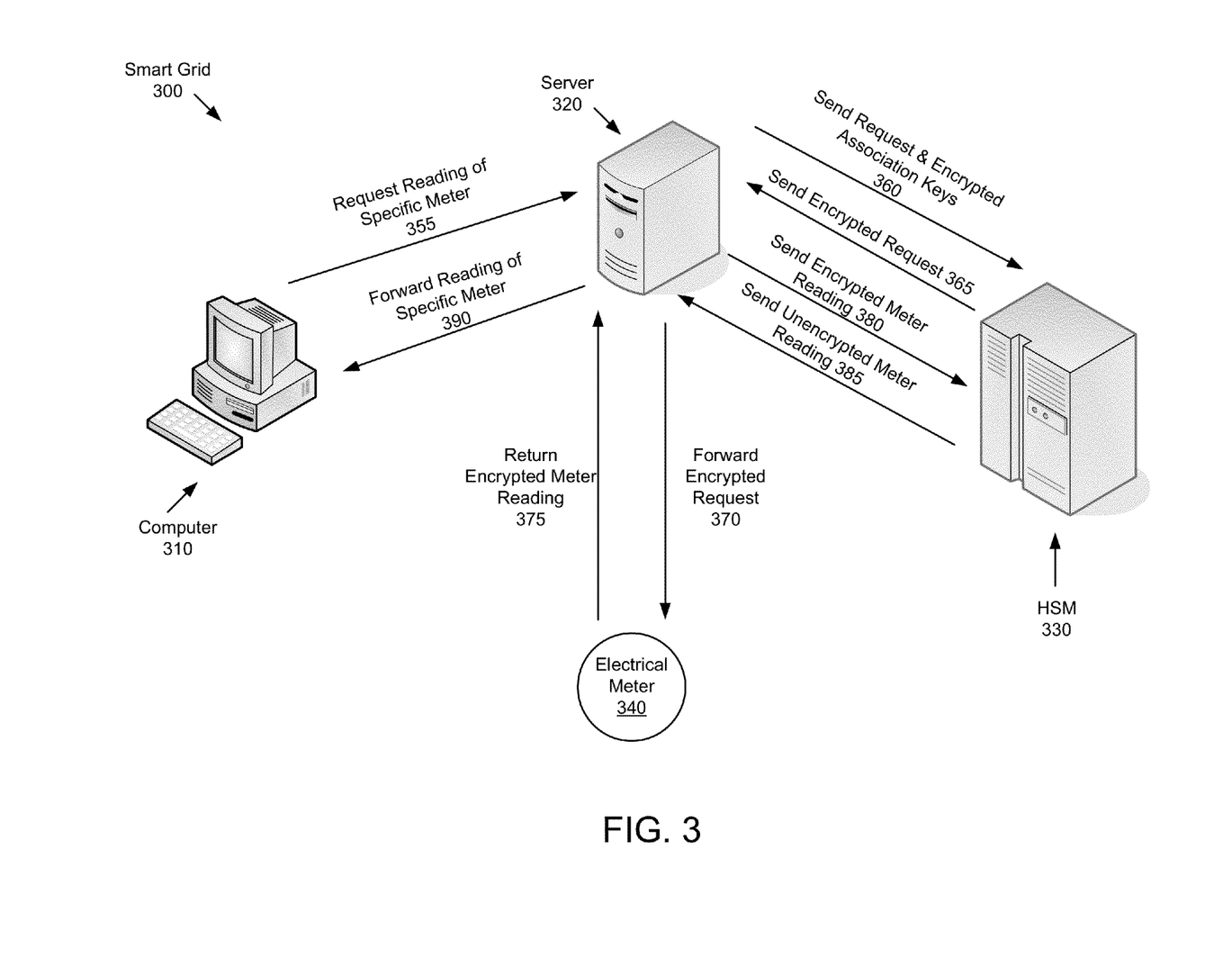
FIG. 3 shows a flow diagram of an example in accordance with one or more embodiments of the invention.

FIG. 3 shows an example of requesting and receiving a meter reading in a, scalable PKI on a smart grid network, in accordance with one or more embodiments of the invention. Specifically, FIG. 3 shows Smart Grid (300), which includes Computer (310), Server (320), HSM (330), and Electrical Meter (340). In this example, Computer (310) is a computer, or other suitable device, operated by an administrator of a utility company that operates Smart Grid (300). Using Computer (310), the administrator has authority to issue one or more requests containing a command to Request Reading of Specific Meter (355), by communicating with Server (320). The request, in this example, contains the command to read a meter and identifies the specific device for which the command is intended.

Upon receiving the meter reading request, Server (320) identifies an association ID for the device. The association ID is an identifier that is unique to each device on the network, and identifies the location of encrypted association keys that will be used to encrypt the meter reading request before it is sent to the intended device. Optionally, the association ID may also identify the location of other data, such as what key was used to wrap/encrypt the association keys. After identifying the association ID, the encrypted association keys and any other data is retrieved by the server, and the server then proceeds to Send Request and Encrypted Association Keys (360) to HSM (330). The meter reading request and encrypted keys may be sent to HSM (330) in any manner.

Upon receipt of the encrypted association keys and the meter reading request, HSM (330) identifies the key used to wrap/encrypt the association keys, and uses the wrapping key to unwrap/decrypt the encrypted association keys. The wrapping key is stored securely on the HSM (330). Once the association keys are unwrapped, they are used to cryptographically process the request, which includes encrypting the request and performing integrity checks. The process of unwrapping the association keys, cryptographically processing the request, and deleting the unwrapped association keys is atomic, and performed by the HSM (330). By cryptographically processing the association keys using a wrapping key stored on the HSM (330), and storing the encrypted association keys on the server, substantial cost and efficiency savings may be had.

Once the request has been encrypted by the HSM (330), the unwrapped association keys are deleted from memory on the HSM (330), as the association keys are no longer needed. Optionally, the deletion from memory may be freeing the reference to the unwrapped association keys. Subsequently, the HSM (330) proceeds to Send Encrypted Request (365) to Server (320). After receiving the encrypted request, Server (320) proceeds to Forward Encrypted Request (370) to Electrical Meter (340). Electrical Meter (340) has a NIC for communicating with Server (320) and processing the received encrypted request. After receiving the encrypted request, Electrical Meter (340) decrypts the encrypted request, confirms its authenticity, and because the request is for a meter read, performs a meter read. Electrical Meter (340) subsequently encrypts the meter read data, and proceeds to Return Encrypted Meter Reading (375) to Server (320).

After receiving the encrypted meter reading, Server (320) again identifies the association ID for Electrical Meter (340), retrieves the encrypted association keys, and proceeds to Send Encrypted Meter Reading (380) to HSM (330). The encrypted association keys are also sent to HSM (330) in Step 380. Upon receiving the encrypted meter reading and the encrypted association keys, HSM (330) again unwraps the encrypted association keys, and uses them to subsequently cryptographically process the encrypted meter reading. The cryptographic processing includes decrypting the encrypted meter reading, and performing an integrity check on the meter reading. The process of unwrapping the encrypted association keys, cryptographically processing the meter reading, and deleting the unwrapped association keys is atomic. After decrypting the message, HSM (330) deletes the unwrapped association keys, and proceeds to Send Unencrypted Meter Reading (385) to Server (320). Server (320) then proceeds to Forward Meter Reading (390) to Computer (310), where the administrator may view the meter reading.

It will be apparent from this specification that the challenges of managing a secure network with millions of endpoints are substantial. By using the method(s) disclosed in this invention, a smart grid network having millions (or tens of millions) of endpoints may be efficiently and cheaply maintained and managed. By example, using the methods of this invention, the number of operations per second may be increased from 3854 to approx. 12,655. The speed of key derivation may also be increased using the methods described above in accordance with one or more embodiments of this invention. Further, the method of this invention provides strong security for every device on the network as well as high availability through load-balancing and failover protocols, as well as allowing for multi-threaded cryptography operations. Other improvements and modifications have been described in the above specification and, as such, the invention should not be limited to the above examples.

Figure 4:
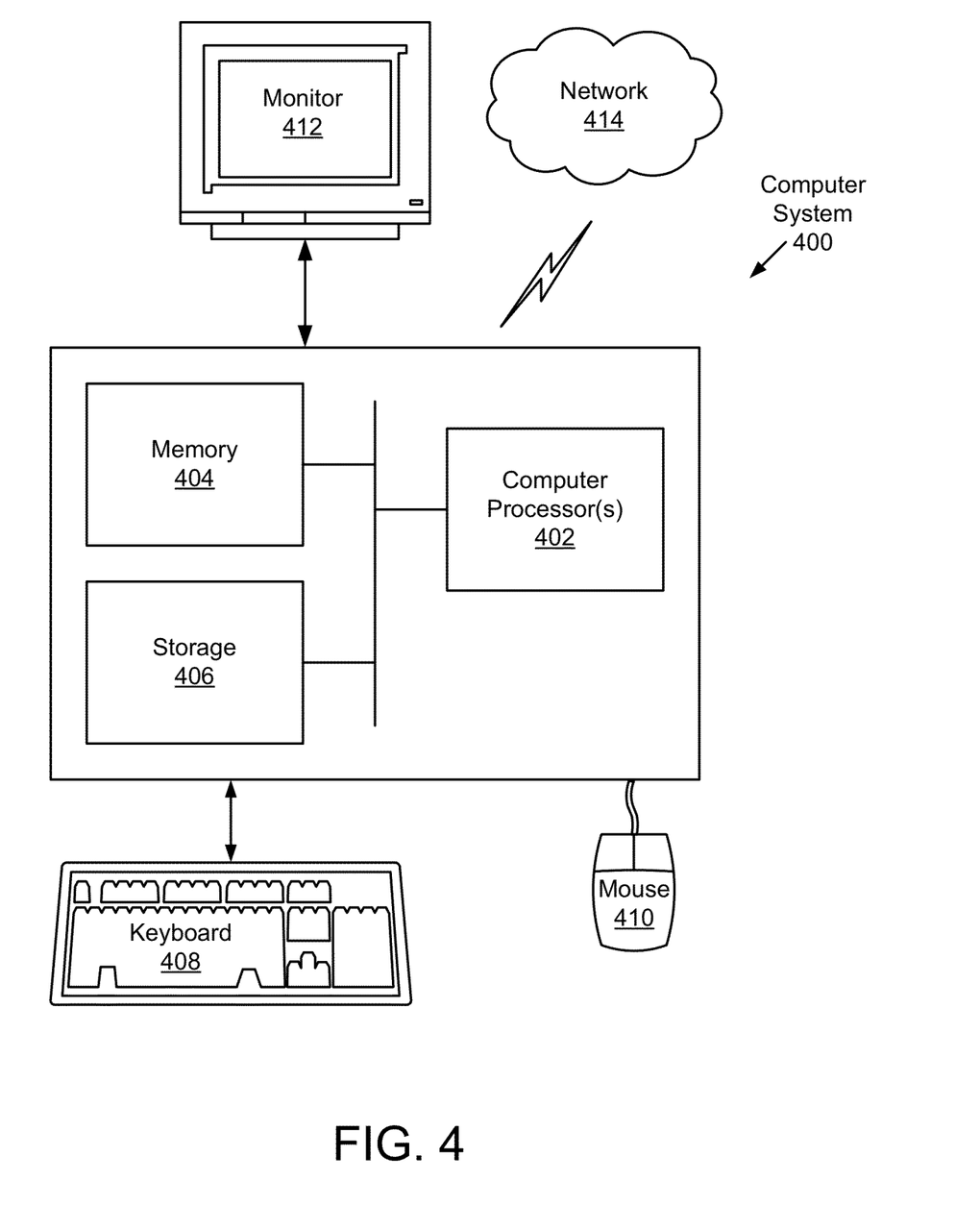
FIG. 4 shows a computer system in accordance with one or more embodiments of the invention.

Embodiments of the invention may be implemented on virtually any type of computer regardless of the platform being used. For example, as shown in FIG. 4, a Computer System (400) includes one or more Computer Processor(s) (402) (such as a central processing unit (CPU), integrated circuit, hardware processor, etc.), associated Memory (404) (e.g., RAM, cache memory, flash memory, etc.), a Storage Device (406) (e.g., a hard disk, an optical drive such as a compact disk drive or digital video disk (DVD) drive, a flash memory stick, etc.), and numerous other elements and functionalities typical of today's computers (not shown). The Computer System (400) may also include input means, such as a Keyboard (408), a Mouse (410), or a microphone (not shown). Further, the Computer System (400) may include output means, such as a Monitor (412) (e.g., a liquid crystal display (LCD), a plasma display, or cathode ray tube (CRT) monitor). The Computer System (400) may be connected to a Network (414) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the Computer System (400) includes at least the minimal processing, input, and/or output means necessary to practice embodiments of the invention.

Further, in one or more embodiments of the invention, one or more elements of the aforementioned Computer System (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for enabling a scalable public-key infrastructure (PKI), comprising:
invoking, by a first application, a process comprising:
receiving, by a server, a message for a device;
identifying, by the server, an association ID for the device;
retrieving, by the server and using the association ID, a plurality of encrypted association keys stored on the server for communicating with the device, wherein the plurality of encrypted association keys are encrypted using a wrapping key stored on a Hardware Security Module (HSM);
sending the message and the plurality of encrypted association keys to the HSM;
unwrapping, by the HSM and using the wrapping key, the plurality of encrypted association keys to create unwrapped association keys;
cryptographically processing, by the HSM and using the unwrapped association keys, the message to generate a processed message;
deleting the unwrapped association keys;
sending the processed message to the device; and
invoking, by a second application, the process, wherein the first application and the second application invoke the process concurrently.

2. The method of claim 1, wherein the process further comprises:
receiving, by the server, a processed response from the device;
identifying, by the server, the association ID for the device;
retrieving, by the server and using the association ID, the plurality of encrypted association keys stored on the server for communicating with the device;
sending the processed response and the plurality of encrypted association keys to the HSM;
unwrapping, by the HSM and using the wrapping key, the plurality of encrypted association keys to create unwrapped association keys;
cryptographically processing, by the HSM using the unwrapped association keys, the processed response to create a response;
deleting the unwrapped association keys; and
sending, by the HSM and to the server, the response.

3. The method of claim 1, wherein the plurality of encrypted association keys further comprise:
a first key for hash-based message authentication code (HMAC), and
a second key for encrypting the message.

4. The method of claim 1, wherein the server, the HSM, and the device are part of a smart grid network.

5. The method of claim 1, wherein the steps of unwrapping, cryptographically processing, and deleting are atomic operations.

6. The method of claim 1, wherein cryptographically processing comprises an integrity check.

7. The method of claim 1, wherein the HSM is a cluster of HSMs in a smart grid network, and wherein the cluster of HSMs load balance.

8. A non-transitory computer-readable medium (CRM) storing a plurality of instructions for enabling a scalable public-key infrastructure (PKI), the plurality of instructions comprising functionality to:
receive a message for a device;
identify an association ID for the device;
retrieve, using the association ID, a plurality of encrypted association keys stored on a server for communicating with the device, wherein the plurality of encrypted association keys are encrypted using a wrapping key stored on a Hardware Security Module (HSM);
send the message and the plurality of encrypted association keys to the HSM;
unwrap, by the HSM and using the wrapping key, the plurality of encrypted association keys to create unwrapped association keys;
cryptographically process, by the HSM using the unwrapped association keys, the message to generate a processed message;
delete the unwrapped association keys;
send the processed message to the device; and
wherein the plurality of instructions are invoked concurrently by a first application and a second application.

9. The non-transitory CRM of claim 8, the instructions further comprising functionality to:
receive a processed response from the device;
identify the association ID for the device;
retrieve the plurality of encrypted association keys stored on the server for communicating with the device;
send the processed response and the plurality of encrypted association keys to the HSM;
unwrap, by the HSM and using the wrapping key, the plurality of encrypted association keys to create unwrapped association keys;
cryptographically process, by the HSM using the unwrapped association keys, the processed response to create a response;
delete the unwrapped association keys; and
send, by the HSM and to the server, the response.

10. The non-transitory CRM of claim 8, wherein the plurality of encrypted association keys further comprise:
a first key for hash-based message authentication code (HMAC), and
a second key for encrypting the message.

11. The non-transitory CRM of claim 8, wherein the server, the HSM, and the device are part of a smart grid network.

12. The non-transitory CRM of claim 8, wherein the steps of unwrapping, cryptographically processing, and deleting are atomic operations.

13. The non-transitory CRM of claim 8, wherein cryptographically processing comprises an integrity check.

14. The non-transitory CRM of claim 8, wherein the HSM is a cluster of HSMs in a smart grid network, and wherein the cluster of HSMs load balance.

15. A system for enabling a scalable Public-Key Infrastructure (PKI), comprising:
a device, configured to receive a processed message; and
an application server configured to:
receive a message for the device,
identify an association ID for the device,
retrieve, using the association ID, a plurality of encrypted association keys stored on the application server for communicating with the device, wherein the plurality of encrypted association keys are encrypted using a wrapping key stored on a Hardware Security Module (HSM),
send the message and the plurality of encrypted association keys to the HSM,
receive the processed message from the HSM, and
send the processed message to the device,
wherein the HSM is configured to:
unwrap, using the wrapping key, the plurality of encrypted association keys to create unwrapped association keys,
cryptographically process, using the unwrapped association keys, the message to generate the processed message,
delete the unwrapped association keys, and
send, to the application server, the processed message
wherein the system is invoked concurrently by a first application and a second application.

16. The system of claim 15, wherein:
the application server is further configured to:
receive a processed response from the device,
identify the association ID for the device,
retrieve the plurality of encrypted association keys stored on the application server for communicating with the device,
send the processed response and the plurality of encrypted association keys to the HSM, and
receive a response from the HSM; and
the HSM is further configured to:
unwrap, using the wrapping key, the plurality of encrypted association keys to create unwrapped association keys,
cryptographically process, using the unwrapped association keys, the processed response to create the response,
delete the unwrapped association keys, and
send, to the application server, the response.

17. The system of claim 15, wherein the plurality of encrypted association keys further comprises:
a first key for hash-based message authentication code (HMAC), and
a second key for encrypting the message.

18. The system of claim 15, wherein the application server, HSM, and the device are part of a smart grid network.

19. The system of claim 15, wherein the steps of unwrapping, encrypting, and deleting are atomic operations.

20. The system claim 15, wherein cryptographically processing comprises an integrity check.

21. The system of claim 15, wherein the HSM is a cluster of HSMs in a smart grid network, and wherein the cluster of HSMs load balance.

* * * * *